United States Patent
Chen et al.

(10) Patent No.: US 9,858,872 B2
(45) Date of Patent: Jan. 2, 2018

(54) ELECTRONIC DEVICE AND CONTROL METHOD

(71) Applicant: HTC Corporation, Taoyuan (TW)

(72) Inventors: Yang-Lin Chen, Taoyuan (TW); Cheng Lo, Taoyuan (TW); Fu-Tsung Chang, Taoyuan (TW); Hsi-Chieh Peng, Taoyuan (TW); Yu-Chun Peng, Taoyuan (TW)

(73) Assignee: HTC CORPORATION, Taoyuan (TW)

( * ) Notice: Subject to any disclaimer, the term of this patent is extended or adjusted under 35 U.S.C. 154(b) by 91 days.

(21) Appl. No.: 14/799,736

(22) Filed: Jul. 15, 2015

(65) Prior Publication Data

US 2017/0018239 A1 Jan. 19, 2017

(51) Int. Cl.
*G09G 3/36* (2006.01)
*G06F 3/041* (2006.01)
*G09G 3/34* (2006.01)

(52) U.S. Cl.
CPC ......... *G09G 3/3607* (2013.01); *G06F 3/0412* (2013.01); *G09G 3/3413* (2013.01); *G09G 3/3611* (2013.01); *G09G 2300/0452* (2013.01); *G09G 2310/027* (2013.01); *G09G 2320/0666* (2013.01)

(58) Field of Classification Search
CPC .. G09G 3/3607; G09G 3/3611; G09G 3/3413; G09G 2300/0452; G09G 2310/027; G09G 2320/0666; G06F 3/0412
USPC ........................................................ 345/690
See application file for complete search history.

(56) References Cited

U.S. PATENT DOCUMENTS

| | | | |
|---|---|---|---|
| 2008/0055339 A1* | 3/2008 | Chao | G09G 3/2003 345/690 |
| 2010/0188615 A1 | 7/2010 | Hung et al. | |
| 2010/0238189 A1 | 9/2010 | Feng | |
| 2012/0009242 A1* | 1/2012 | Casey | A61L 15/24 424/446 |
| 2014/0176859 A1* | 6/2014 | Lin | G02F 1/133514 349/62 |

(Continued)

FOREIGN PATENT DOCUMENTS

| | | | | |
|---|---|---|---|---|
| EP | 2874001 A1 * | 5/2015 | | G02F 1/133509 |
| TW | 200812402 A | 3/2008 | | |

(Continued)

*Primary Examiner* — Amare Mengistu
*Assistant Examiner* — Jennifer Zubajlo
(74) *Attorney, Agent, or Firm* — Birch, Stewart, Kolasch & Birch, LLP

(57) ABSTRACT

An electronic is provided. An input unit provides a multimedia content. An image processor transforms the multimedia content into frame data. A display unit displays images including blue pixels, green pixels, and red pixels. A backlight unit generates a source light. A source light includes a deep blue-light of a low blue waveband and a far blue-light of a high blue waveband. A display panel transforms the source light into the images based on the frame data and emits the images through a surface. An optical path travels through the backlight unit and the surface. A deep blue-light filter is arranged in the optical path through which the source light passes, for restricting a light transmission rate in the low blue waveband. The image processor adjusts a color hue of the frame data to be transformed by the display panel.

47 Claims, 18 Drawing Sheets

(56) References Cited

U.S. PATENT DOCUMENTS

| | | | | |
|---|---|---|---|---|
| 2015/0002528 A1* | 1/2015 | Bohn | ................ | G02B 27/0172 345/589 |
| 2015/0009242 A1* | 1/2015 | Park | .................... | G09G 3/3233 345/690 |
| 2015/0070624 A1* | 3/2015 | Liu | .................. | G02F 1/133514 349/61 |
| 2015/0098210 A1* | 4/2015 | Arakawa | ........... | G02F 1/133504 362/97.2 |
| 2015/0261010 A1* | 9/2015 | Kudla | ...................... | G02B 5/23 351/159.61 |
| 2016/0180780 A1* | 6/2016 | Chen | ................... | G09G 3/2003 345/207 |

FOREIGN PATENT DOCUMENTS

| | | | |
|---|---|---|---|
| TW | 200905136 A | | 2/2009 |
| TW | 200912432 A | | 3/2009 |
| TW | M489290 U | | 11/2014 |
| TW | 201510622 A | | 3/2015 |
| TW | 201514553 A | | 4/2015 |
| TW | 201520608 A | * | 6/2015 |
| TW | 201520608 A | | 6/2015 |
| TW | M504704 U | | 7/2015 |

\* cited by examiner

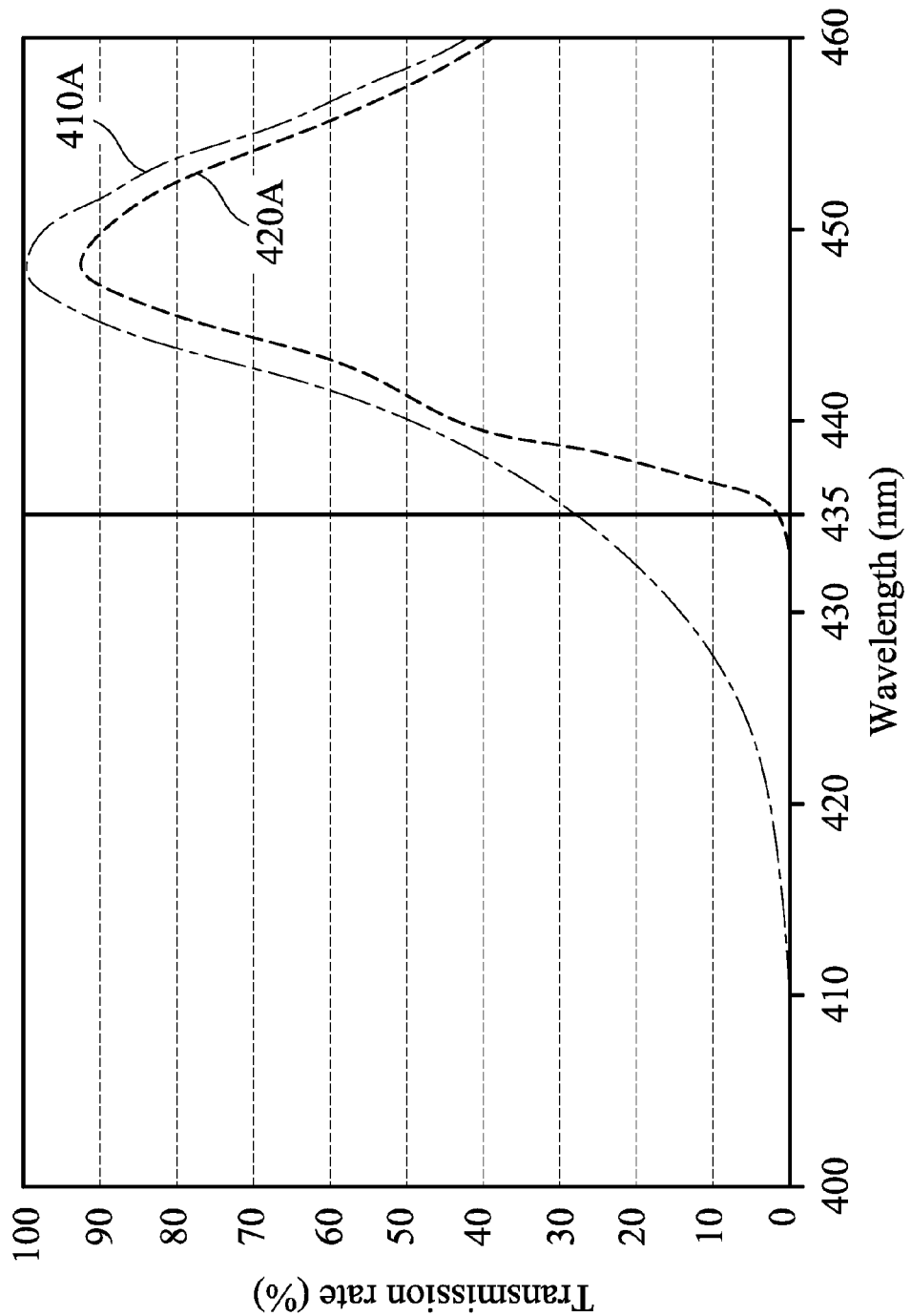

|  | Scratch | Color Correction |
|---|---|---|
| FIG. 3A | Best | Default Correct |
| FIG. 8 | Medium | Auto |
| FIG. 3B | Worst | Medium |

FIG. 11

ELECTRONIC DEVICE AND CONTROL METHOD

BACKGROUND OF THE INVENTION

Field of the Invention

The invention relates to an electronic device, and more particularly to an electronic device restricting a light transmission rate in a low blue waveband.

Description of the Related Art

As technology has developed, the types of electronic devices available on the market have increased, as have the functions they perform. Today's electronic devices are capable of displaying images. Each image may have a deep blue-light of a low blue waveband and a far blue-light of a high blue waveband. As shown in FIG. 1, the blue-light is the light with a wavelength within 380 nm-480 nm.

The deep blue-light has strong intensity, which may cause damage to the human eye. There are two conventional methods to filter the deep blue-light. One conventional method is to reduce the whole blue-light directly by digital setting. However, the side effect of the conventional method is a color balance. As shown in FIG. 2A, since the intensity in the wavelength 450 nm is reduced from 100% to Z%, the color of the displayed images is yellowish as shown in FIG. 2B.

The other conventional method is to attach a protection film with an electronic device to reduce the intensity of the deep blue-light. However, a color balance impact will be inconsistent by different makers because there is no general rule in the market. As shown in FIG. 2C, different protection films have different efficiencies.

BRIEF SUMMARY OF THE INVENTION

In accordance with an embodiment, an electronic device comprises an input unit, an image processor, and a display unit. The input unit provides a multimedia content. The image processor transforms the multimedia content into frame data. The display unit displays images including blue pixels, green pixels, and red pixels, and comprises a backlight unit, a display panel, and a deep blue-light filter. The backlight unit generates a source light. The source light includes a deep blue-light of a low blue waveband and a far blue-light of a high blue waveband. The display panel transforms the source light into the images based on the frame data and emits the images through a surface. An optical path travels through the backlight unit and the surface. The deep blue-light filter is arranged in the optical path through which the source light passes, for restricting a light transmission rate in the low blue waveband. The image processor adjusts a color hue of the frame data to be transformed by the display panel such that a weight of the blue pixels of the image is compensated.

An exemplary embodiment of a control method controlling an electronic device and comprising providing a multimedia content; transforming the multimedia content into frame data; and displaying images including blue pixels, green pixels, and red pixels, The step of display the images comprises activating a backlight unit for generating a source light, wherein the source light includes a deep blue-light of a low blue waveband and a far blue-light of a high blue waveband; activating a display panel, for transforming the source light into the images based on the frame data and emitting the images through a surface, wherein an optical path travels through the backlight unit and the surface; arranging a deep blue-light filter in the optical path through which the source light passes, for restricting a light transmission rate in the low blue waveband; and adjusting a color hue of the frame data to be transformed by the display panel such that a weight of the blue pixels of the image is compensated.

In accordance with another embodiment, a display system comprises an electronic device and a cover. The electronic device comprises an input unit, an image processor, and a display unit. The input unit provides a multimedia content. The image processor transforms the multimedia content into frame data. The display unit displays images including blue pixels, green pixels, and red pixels, and comprises a backlight unit and a display panel. The backlight unit generates a source light including a deep blue-light of a low blue waveband and a far blue-light of a high blue waveband. The display panel transforms the source light into the images based on the frame data and emits the images through a surface. The cover comprises a deep blue-light filter for restricting a light transmission rate in the low blue waveband. The covering mechanism is movably placed the cover on the surface of the display unit. The image processor is configured to determine that the cover has been placed on the surface; and adjust a color hue of the frame data to be transformed by the display panel such that a weight of the blue pixels of the image is compensated in response to determining that the cover has been placed on the surface.

Another exemplary embodiment of a control method comprises providing a multimedia content; transforming the multimedia content into frame data; and displaying images including blue pixels, green pixels, and red pixels. The step of displaying images comprises activating a backlight unit for generating a source light, wherein the source light includes a deep blue-light of a low blue waveband and a far blue-light of a high blue waveband; activating a display panel for transforming the source light into the images based on the frame data and emitting the images through a surface; determining that a cover has been placed on the surface, wherein the cover comprises a deep blue-light filter for restricting a light transmission rate in the low blue waveband; and adjusting a color hue of the frame data to be transformed by the display panel such that a weight of the blue pixels of the image is compensated in response to determining that the cover has been placed on the surface. A covering mechanism is movably placed on the surface of the display panel.

Another exemplary embodiment of a display device is capable of being placed into a case of a head mounted display device and comprises a sensing unit, an input device, an image processor, and a display unit. The sensing unit senses whether the display device has been placed into the case. The input device provides a multimedia content. The image processor transforms the multimedia content into frame data. The display unit displays images including blue pixels, green pixels, and red pixels, and comprises a backlight unit and a display panel. The backlight unit generates a source light. The source light includes a deep blue-light of a low blue waveband and a far blue-light of a high blue waveband. The display panel transforms the source light into the images based on the frame data. The image processor is configured to inquire identification data including identification of the case if the sensing unit senses that the display device has been placed into the case; and adjust a color hue of the frame data to be transformed by the display panel such that a weight of the blue pixels of the image is compensated if the identification data match a predetermined criterion.

Another exemplary embodiment of a control method for a display device capable of being placed into a case of a head mounted display device comprises providing a multimedia content; transforming the multimedia content into frame data; displaying images including blue pixels, green pixels, and red pixels. The step of display the images comprises generating a source light, wherein the source light includes a deep blue-light of a low blue waveband and a far blue-light of a high blue waveband; transforming the source light into the images based on the frame data; inquiring identification data including identification of the case when the display device has been placed into the case; and adjusting a color hue of the frame data such that a weight of the blue pixels of the image is compensated if the identification data match a predetermined criterion.

A detailed description is given in the following embodiments with reference to the accompanying drawings.

BRIEF DESCRIPTION OF THE DRAWINGS

The invention can be more fully understood by referring to the following detailed description and examples with references made to the accompanying drawings, wherein:

FIGS. 4A and 4B show spectrums for the electronic devices of FIGS. 3A and 3B;

FIG. 11 shows a table showing brightness, scratch and color correction of FIGS. 3A, 3B and 8.

DETAILED DESCRIPTION OF THE INVENTION

The following description is of the best-contemplated mode of carrying out the invention. This description is made for the purpose of illustrating the general principles of the invention and should not be taken in a limiting sense, The scope of the invention is best determined by reference to the appended claims.

Figure 1:
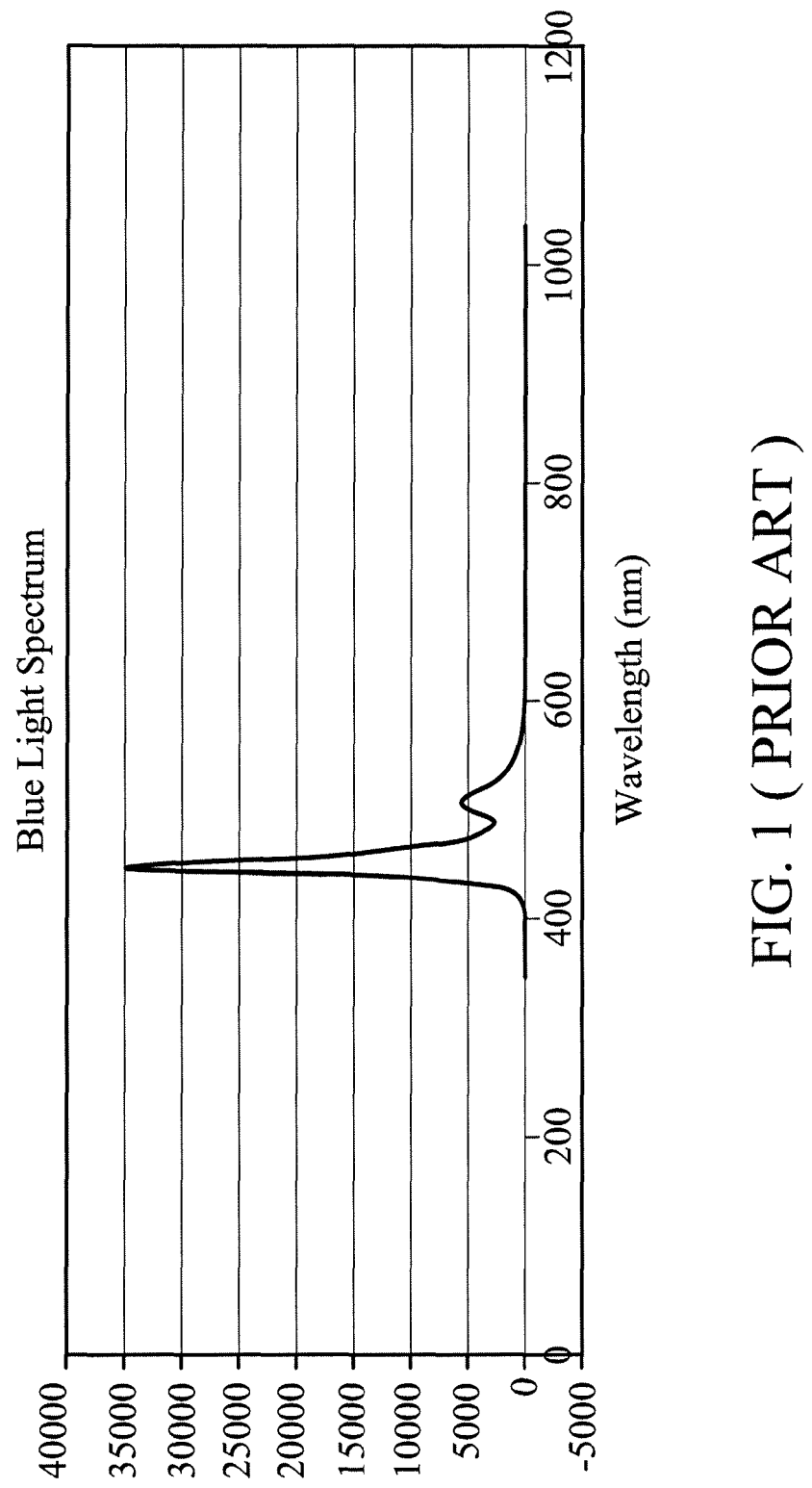
FIG. 1 shows the spectrum of the blue-light.
Figure 2A:
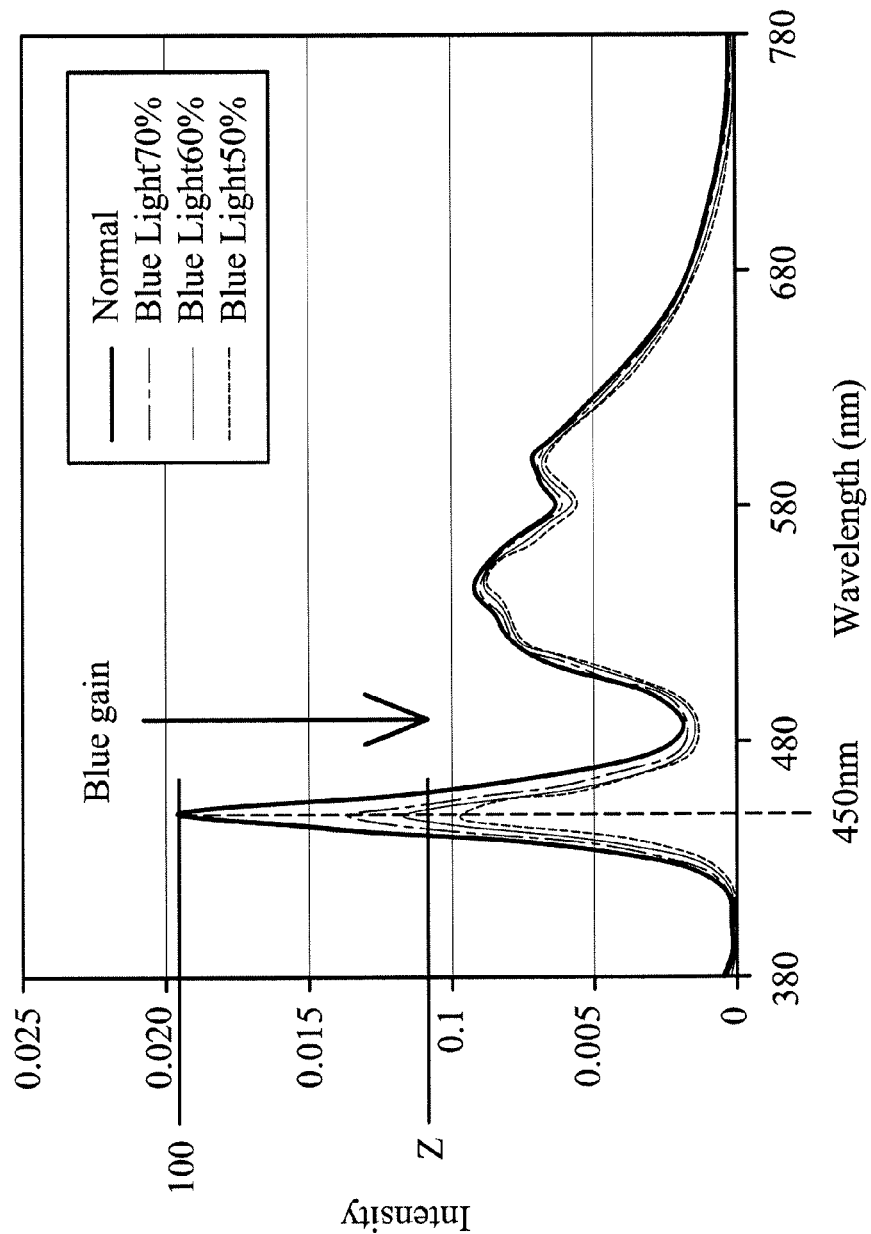
FIG. 2A-2C show the results of the conventional methods for reduce the intensity of the deep blue-light.
Figure 2B:
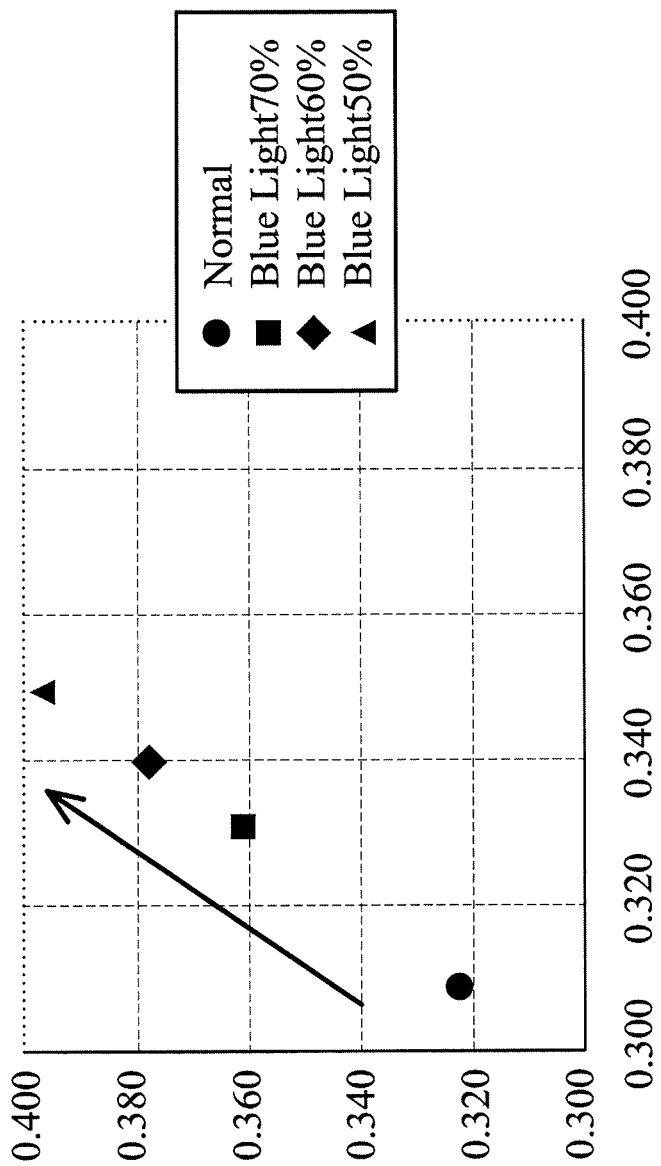
Figure 2C:
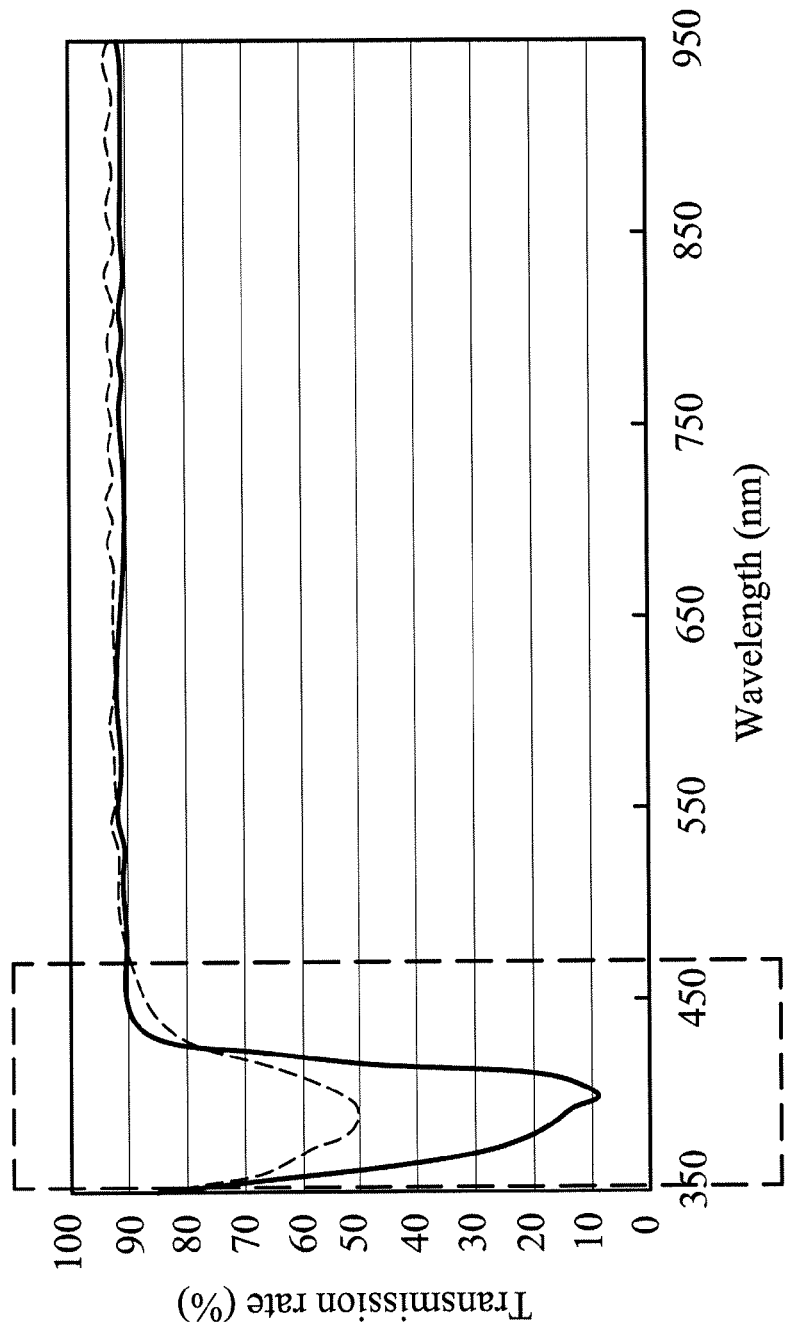
Figure 3A:
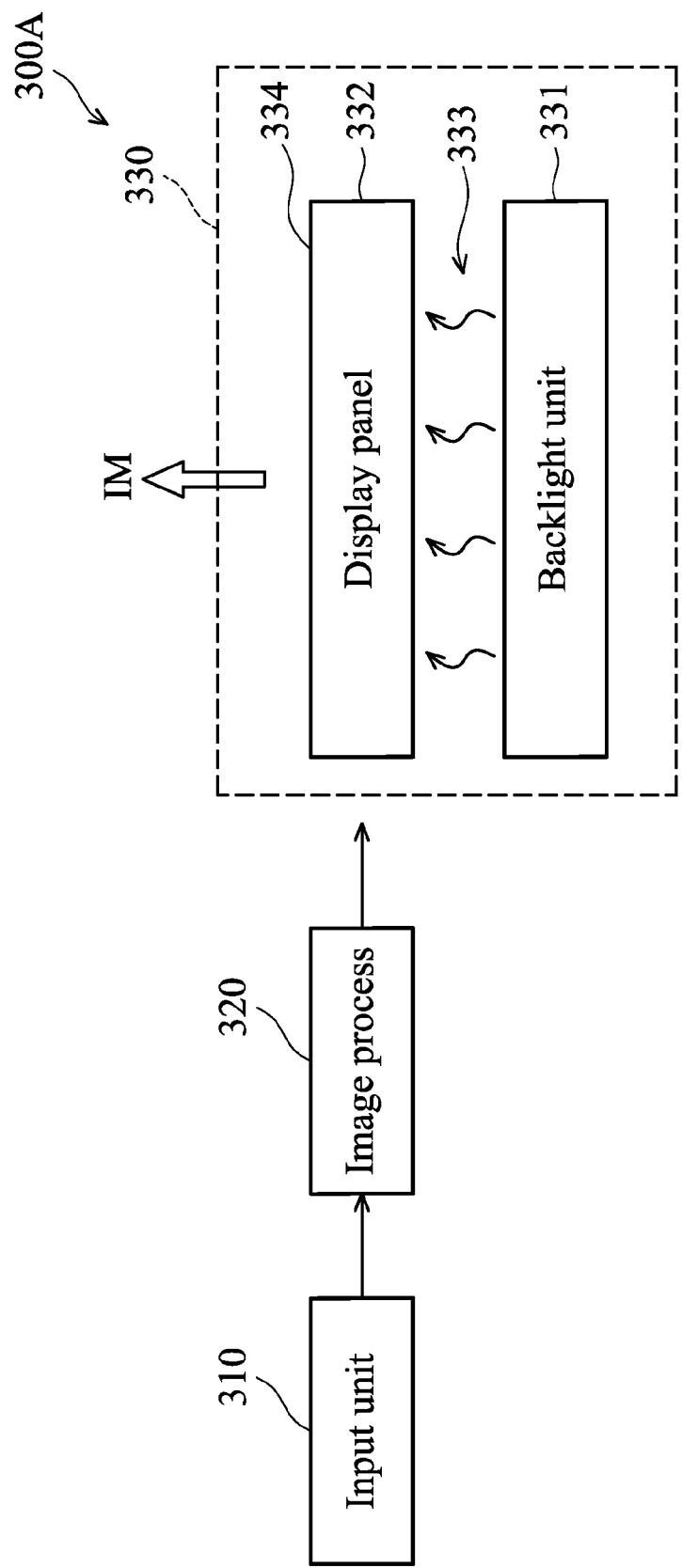
FIGS. 3A and 3B are schematic diagrams of exemplary embodiments of electronic devices, according to various aspects of the present disclosure.

FIG. 3A is a schematic diagram of an exemplary embodiment of an electronic device, according to various aspects of the present disclosure. The electronic device 300 comprises an input unit 310, an image processor 320, and a display unit 330. The input unit 310 provides a multimedia content. In one embodiment, the input unit 310 may be a memory or a receiving processor for receiving and storing wireless signals. The image processor 320 transforms the multimedia content stored in the input unit 310 into frame data.

The display unit 330 displays images IM. Each of the images IM includes blue pixels, green pixels, and red pixels. The display unit 330 comprises a backlight unit 331 and a display panel 332. The backlight unit 331 generates a source light 333, The source light 333 includes a deep blue-light of a low blue waveband and a far blue-light of a high blue waveband. The display panel 332 transforms the source light 333 into the images IM based on the frame data generated by the image processor 320 and emits the images IM through a surface 334. In this embodiment, an optical path travels through the backlight unit 331 and the surface 334.

A deep blue-light filter (not shown) is arranged in the optical path through which the source light 333 passes, for restricting a light transmission rate in the low blue waveband. In this embodiment, the deep blue-light filter restricts 70% of the light transmission rate in the low blue waveband. In one embodiment, the low blue waveband comprises a specific wavelength, and the specific wavelength is 435 nm.

The image processor 320 adjusts a color hue of the frame data to be transformed by the display panel 332 such that a weight of the blue pixels of the image IM is compensated. In one embodiment, the image processor 320 adjusts the frame data to adjust the color hue, but the disclosure is not limited thereto. In another embodiment, the image processor 320 adjust the setting of a driver (not shown), which may be included in the display panel 332. In another embodiment, the image processor 320 increases voltage levels corresponding to gray levels provided to the blue pixels to keep optical performance without color balance impact. In some embodiments, the image processor 320 reduces gray levels provided to the red and green pixels to compensate the color balance impact.

Additionally, the invention is not limited to the location in which the deep blue-light filter is disposed. In one embodiment, the deep blue-light filter may be disposed in the display panel 332 or the backlight unit 331. In this case, since the deep blue-light filter is under a touch cover glass disposed in the display panel 332, there is no scratch concern which may be caused by finger or external chemical material. In another embodiment, the deep blue-light filter may be embedded in a protection film 335 attached on the display panel 332 shown in FIG. 3B. In this case, an option icon is designed in an OS setting folder such that a user is capable of enabling color correction manually when protection film 335 is attached on the display panel 332.

Figure 4B:
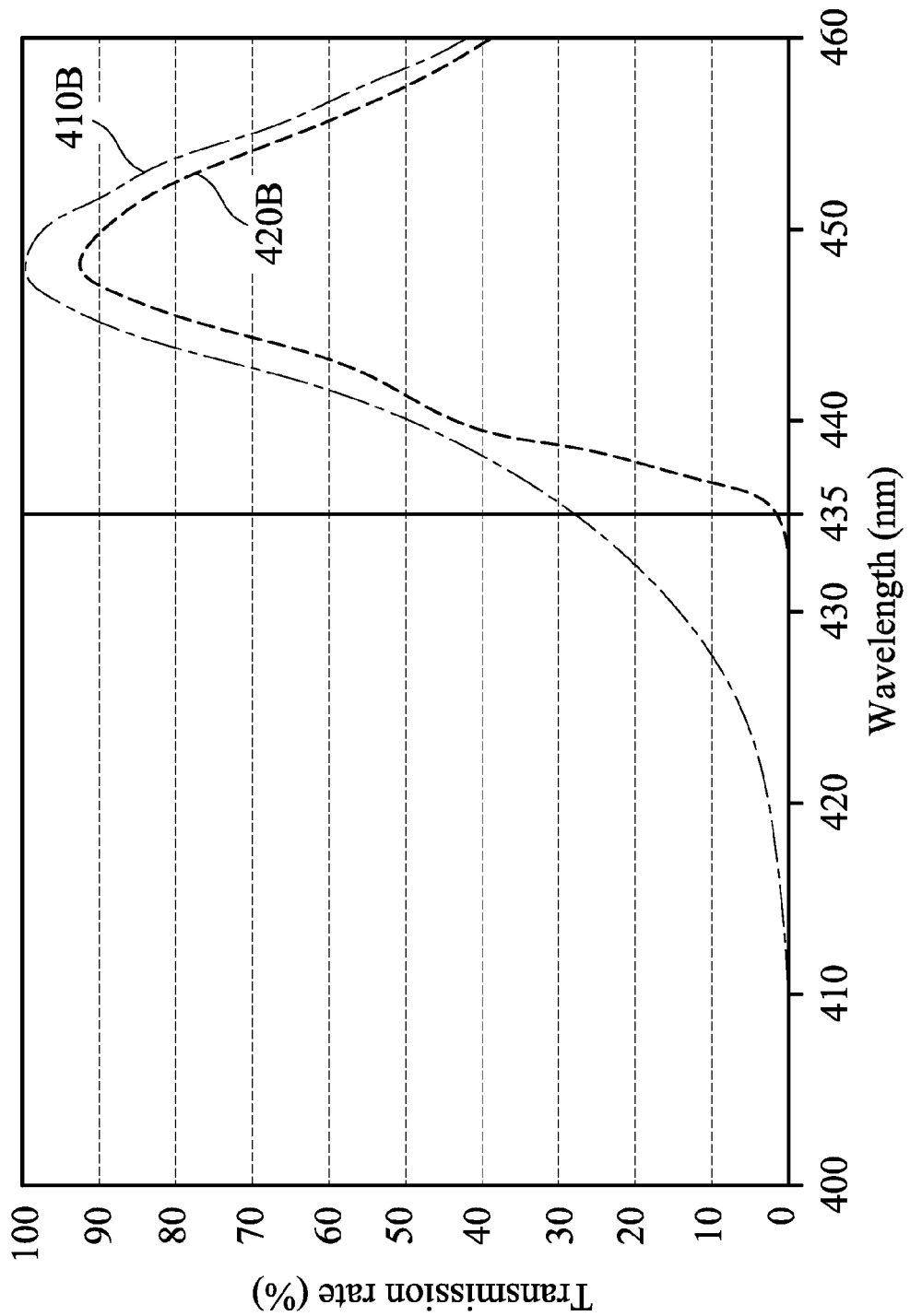

FIGS. 4A and 4B shows spectrum diagrams for electronic devices 300A and 300B, respectively. As shown in FIG. 4A or 4B, the curve 410A or 410B represents an original light, which does not traveling through a deep blue-light filter. The curve 420A or 420B represents a light, which travels through a deep blue-light filter. As shown in FIG. 4A or 4B, the transmission rate in the wavelength 435 nm of the curve 420A or 420B is lower than that of the curve 410A or 410B. In one embodiment, the deep blue-light filter restricts 70% of the light transmission rate in the low blue waveband. Although the brightness is degraded by around 10%, the brightness will be adjusted by the image processor 320. Therefore, the optical performance without color balance impact is keep.

Figure 5:
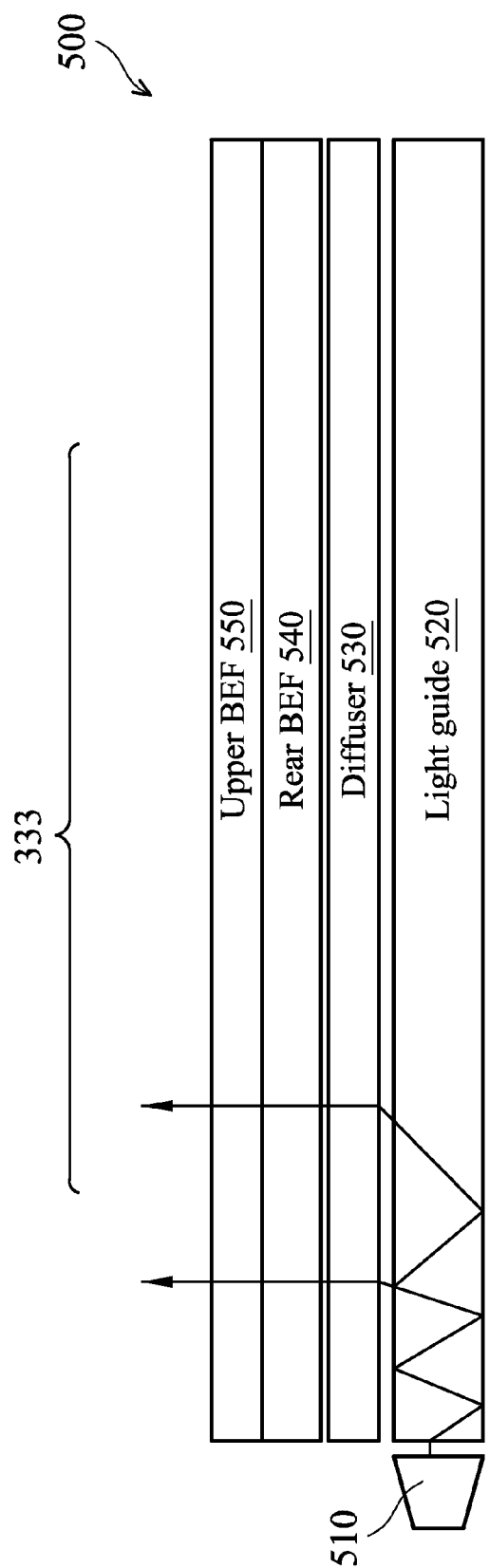
FIG. 5 is a schematic diagram of an exemplary embodiment of a backlight unit, according to various aspects of the present disclosure.

FIG. 5 is a schematic diagram of an exemplary embodiment of a backlight unit, according to various aspects of the present disclosure. In this embodiment, the backlight unit 500 is an edge-light type backlight module, but the disclosure is not limited thereto. In some embodiments, the backlight unit 500 is a bottom-light type or a hollow type backlight module. As shown in FIG. 5, the backlight unit 500 comprises a light emitting diode (LED) 510, a light guide 520, a diffuser 530, a rear brightness enhance film (BEF) 540, and an upper BEF 550. The LED 510 is configured to generate white-light. The light guide 520 is configured to guides the white-light. The diffuser 530 is disposed on the light guide 520 to increase the uniformity of the light traveling through the light guide 520. The BEFs 540 and 550 centralize light to center. In one embodiment, the BEFs 540 and 550 have prism structures to increase center brightness. The light traveling through the BEF 550 is served as the source light 333 shown in FIG. 3A.

A deep blue-light filter (not shown) may be formed in the backlight unit 500. In this case, no additional Optically Clear Adhesive (OCA) is required. Therefore, the thickness of the backlight unit 500 with the deep blue-light filter is not obviously increased. In one embodiment, a deep blue-light filter is formed above the upper BEF 550 to restrict the light transmission rate of the light 333. In this case, the deep blue-light filter may be a multilayer coating structure. Since the light passing through the rear BEF 540 and the upper BEF 550 will vertically enter the deep blue-light filter, the deep blue-light filter is capable of restricting the light transmission rate. In other embodiments, the deep blue-light filter may be disposed in the LED 510, between the light guide 520 and the diffuser 530, or between the diffuser 530 and the rear BEF 540.

Figure 6:
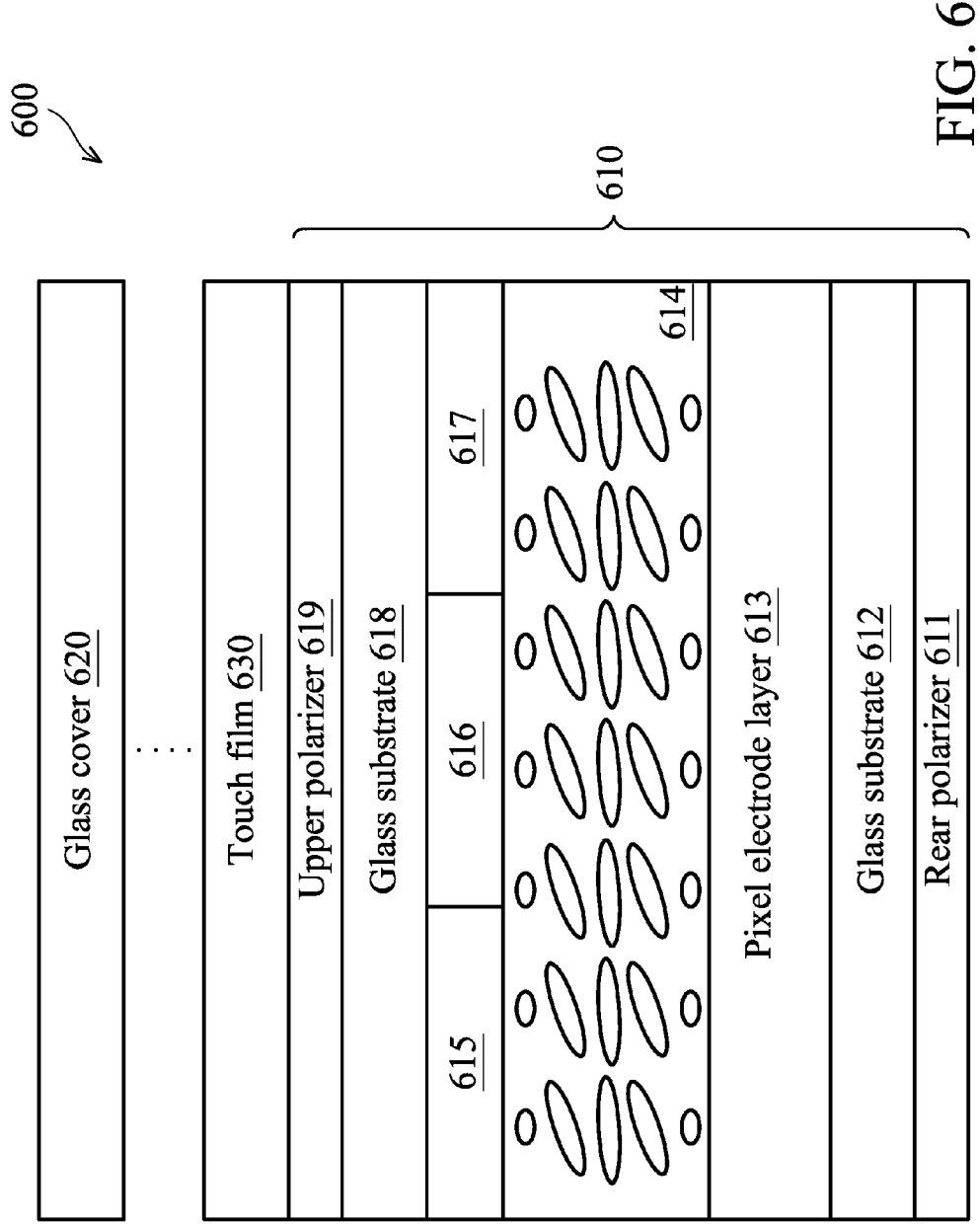
FIG. 6 is a schematic diagram of an exemplary embodiment of a display panel, according to various aspects of the present disclosure.

FIG. 6 is a schematic diagram of an exemplary embodiment of a display panel, according to various aspects of the present disclosure. The display panel 600 comprises a liquid crystal cell 610 and a glass cover 620. In one embodiment, a deep blue-light filter is disposed under or in the liquid crystal cell 610. In this case, since the ambient light emitting the display panel 600 will be filtered by the liquid crystal cell 610, the deep blue-light filter does not reflect the deep blue-light of the ambient light. Therefore, the reflective color of the image displayed by the panel unit 600 is not purplish. In this case, the deep blue-light filter may be a multilayer coasting.

In another embodiment, a deep blue-light filter is disposed between the liquid crystal cell 610 and the glass cover 620. In this case, the deep blue-light filter may be attached to the glass cover 620. In other embodiments, the deep blue-light filter is disposed on the glass cover 620. In this case, the deep blue-light filter may be constituted by absorbing materials to avoid that the deep blue-light component of the ambient light emiting the glass cover 620 is reflected by the deep blue-light filter. Therefore, the reflective color of the image displayed by the panel unit 600 is not purplish.

The liquid crystal cell 610 comprises a rear polarizer 611, a glass substrate 612, a pixel electrode layer 613, a liquid crystal layer 614, a red filter 615, a green filter 616, a blue filter 617, a glass substrate 618, and an upper polarizer 619. The rear polarizer 611 and the upper polarizer 619 are configured to polarize light. The pixel electrode layer 613 comprises a plurality of thin film transistors (TFTs). The red filter 615 filters green-light and blue-light. The green filter 616 filters red-light and blue-light. The blue filter 617 filters red-light and green-light.

A driver provides a red gray level, a green gray level, and a blue gray level to the red filter 615, the green filter 616 and the blue filter 617 to adjust the color hue of the liquid crystal cell 610. The invention does not limit how the driver adjusts the color hue. In one embodiment, the driver adjusts voltages corresponding to the gray levels. For example, the driver increases the voltage corresponding to the blue gray level and reduces the voltages corresponding to the red and green gray levels. Therefore, the optical performance without color balance impact is kept. In another embodiment, the driver provides the corresponding gray levels to increase the transmission rate of the blue-light traveling through the display panel 600.

In other embodiment, the display panel 600 further comprises a touch film 630 disposed between the glass cover 620 and the liquid crystal cell 610. The touch film 630 is configured to detect a touch action. A deep blue-light filter may be disposed between the touch film 630 and the glass cover 620 or between the touch film 630 and the liquid crystal cell 610. In one embodiment, the deep blue-light filter may be integrated into the touch film 630.

Figure 7:
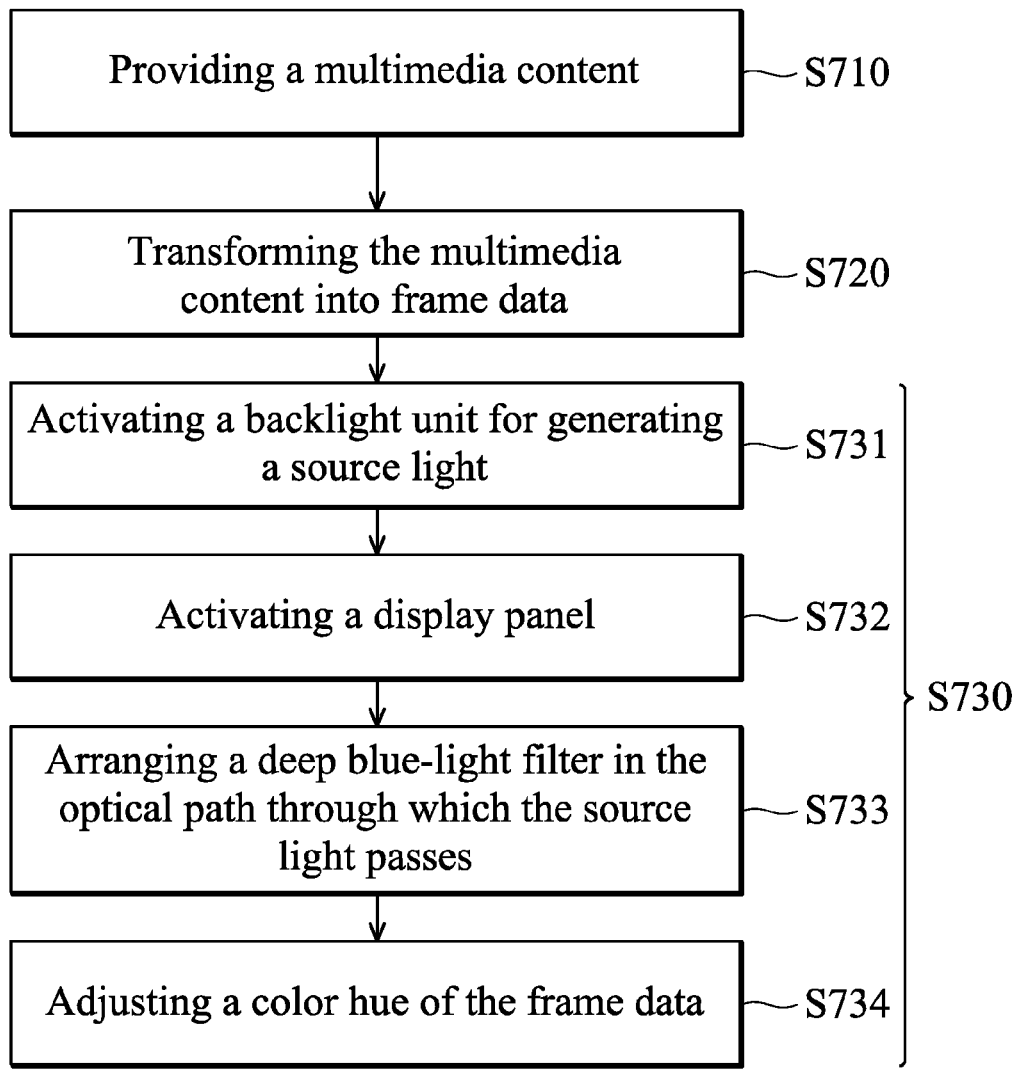
FIGS. 7, 10A, 10B, and 13 are flowcharts of exemplary embodiments of control methods, according to various aspects of the present disclosure

FIG. 7 is a schematic diagram of an exemplary embodiment of a control method, according to various aspects of the present disclosure. The control method is applied in an electronic device. The invention is not limited by the kind of electronic device. In one embodiment, the electronic device is a smartphone. First, a multimedia content is provided (step S710). In one embodiment, the multimedia content is provided by a memory or a processor, which receives wireless signals. The multimedia content is transformed into frame data (step S720). In one embodiment, an image processor is utilized to transform the multimedia content. Images are displayed (step S730). In one embodiment, each of the images includes blue pixels, green pixels, and red pixels. In this embodiment, step S730 comprises steps S731-S734. Step S731 activates a backlight unit for generating a source light. The source light includes a deep blue-light of a low blue waveband and a far blue-light of a high blue waveband. Step S732 activates a display panel for transforming the source light into the images based on the frame data and emits the images through a surface. In this embodiment, an optical path travels through the backlight unit and the surface.

A deep blue-light filter is arranged in the optical path through which the source light passes, for restricting a light transmission rate in the low blue waveband (step S733). In one embodiment, the deep blue-light filter is disposed in the backlight unit. In another embodiment, the deep blue-light filter is disposed in the display panel. In some embodiments, various deep blue-light filters are disposed in the backlight unit and/or the display panel. Since the deep blue-light filter is under a touched glass cover, there is no scratch which may be caused by finger or external chemical material. In one embodiment, the deep blue-light filter restricts 70% of the light transmission rate in the low blue waveband.

A color hue of the frame data to be transformed by the display panel is adjusted such that a weight of the blue pixels of the image is compensated (step S734). In one embodiment, step S734 is to increase voltage levels corresponding to gray levels provided to the blue pixels. In another embodiment, step S734 is to reduce gray levels provided to the red and green pixels. Therefore, a good color balance is maintained.

Figure 8:
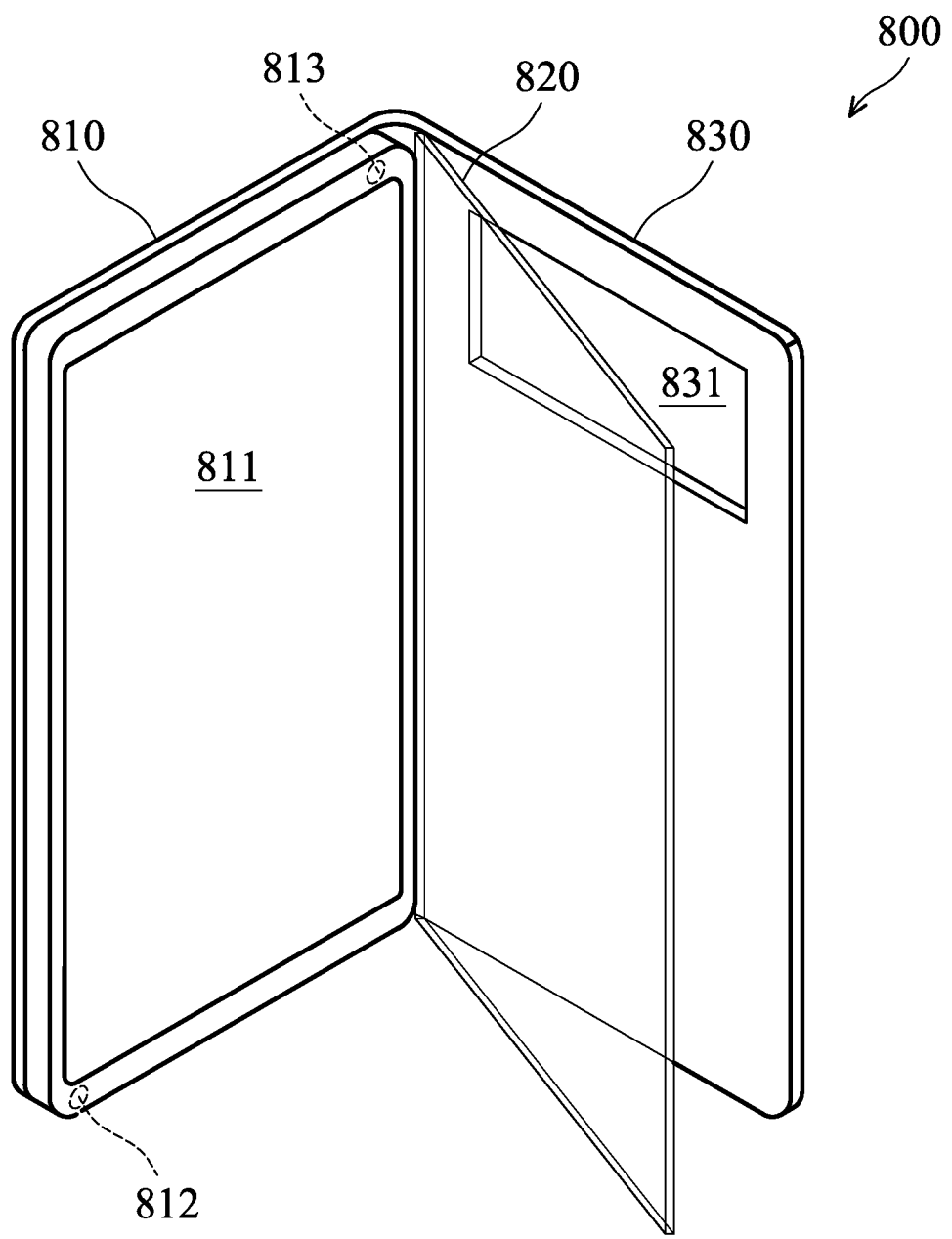
FIGS. 8 and 12 are schematic diagrams of exemplary embodiments of display systems, according to various aspects of the present disclosure.

FIG. 8 is a schematic diagram of another exemplary embodiment of a display system, according to various aspects of the present disclosure. The display system 800 comprises an electronic device 810, a cover 820, and a covering mechanism 830. Since the electronic device 810 is similar to the electronic device 300 with exception that the electronic device 810 does not comprise a deep blue-light filter. In this embodiment, the electronic device 810 also comprises an input unit, an image processor and a display unit. Since the input unit, the image processor and the display unit of the electronic device 810 are similar to the input unit 310, the image processor 320 and the display unit 330 of the electronic device 300, the description of the input unit, the image processor and the display unit of the electronic device 810 are omitted for brevity.

In this embodiment, the cover 820 comprises a deep blue-light filter, which is a film integrated into the cover 820.

In one embodiment, the cover 820 further comprises two polyethylene terephthalate (PET) films. The deep blue-light filter is disposed between the PET films to avoid the deep blue-light filter being scratched. The deep blue-light filter restricts a light transmission rate in the low blue waveband. In one embodiment, the deep blue-light filter restricts 70% of the light transmission rate in the low blue waveband. The low blue waveband comprises a specific wavelength, which is 435 nm. The covering mechanism 830 is movably placed the cover 820 on the surface 811 of the display unit 810.

In one embodiment, a sensor 812 is disposed on the surface 811 to detect whether the cover 820 has been placed on the surface 811. In another embodiment, the sensor 812 may be a Hall sensor. When the cover 820 has been placed on the surface 811, the sensor 812 activates the image processor of the electronic device 810. Then, the image processor of the electronic device 810 adjusts a color hue of the frame data to be transformed by the display panel of the electronic device 810. Therefore, a weight of the blue pixels of the image is compensated in response to determining that the cover 820 has been placed on the surface 811. In another embodiment, when the cover 820 has not been placed on the surface 811, the sensor 812 notifies the image processor of the electronic device 810. The image processor stops adjusting the color hue of the frame data to be transformed by the display panel.

In some embodiments, the electronic device 810 further comprises a sensor 813. The sensor 813 detects the brightness of an external light illumining the surface 811. When the brightness of the external light exceeds a predetermined brightness, the sensor 813 notifies the image processor of the electronic device 810. The image processor of the electronic device 810 stops adjusting the color hue of the frame data to be transformed by the display panel.

Figure 9:
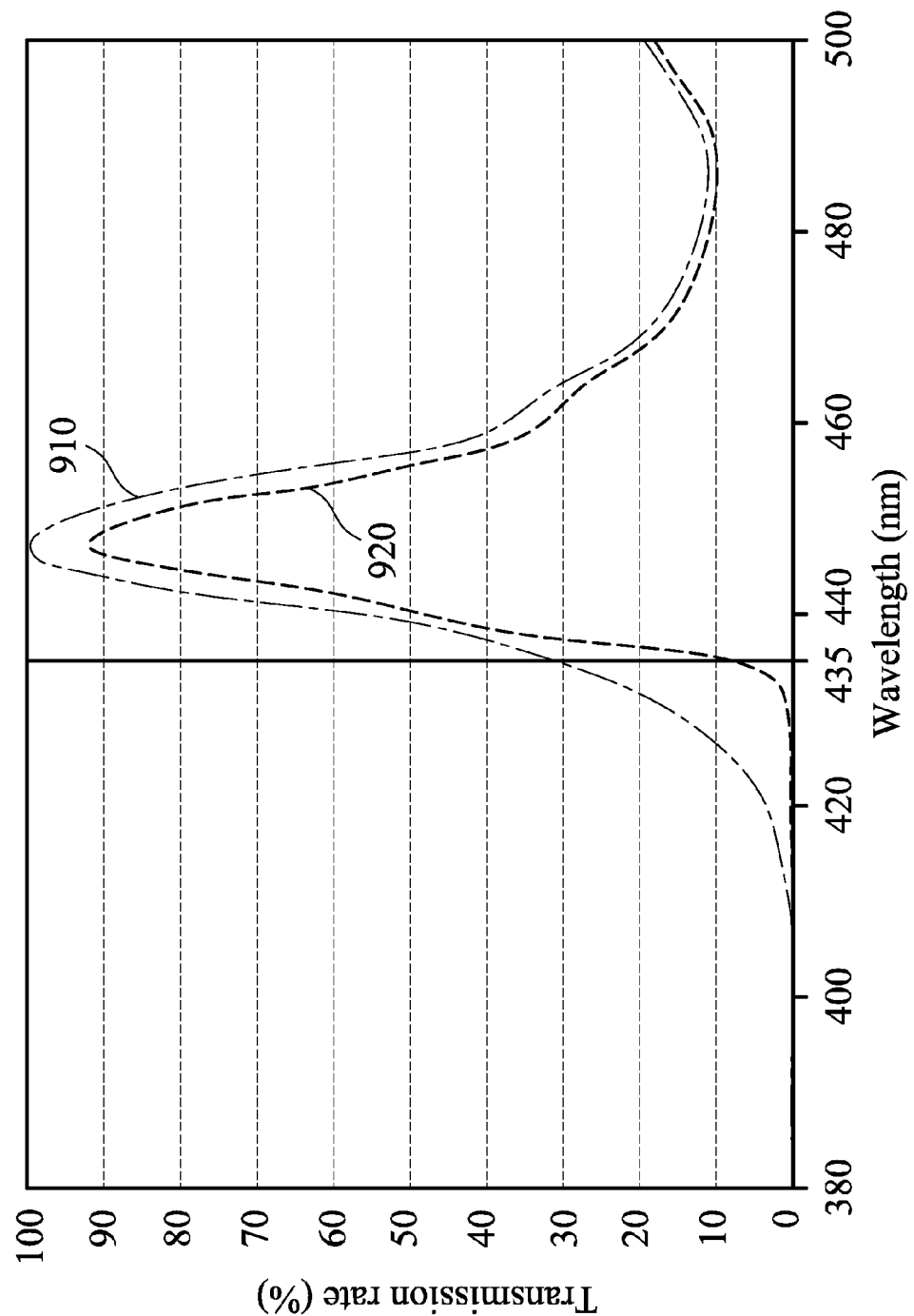
FIG. 9 shows spectrum for the display system of FIG. 8.

FIG. 9 shows a spectrum diagram. The curve 910 represents an original light, which does not traveling through the deep blue-light filter. The curve 920 represents a light, which travels through the deep blue-light filter. As shown in FIG. 9, the transmission rate in the wavelength 435 nm of the curve 920 is lower than that of the curve 910. In one embodiment, the deep blue-light filter restricts 70% of the light transmission rate in the low blue waveband.

Figure 10A:
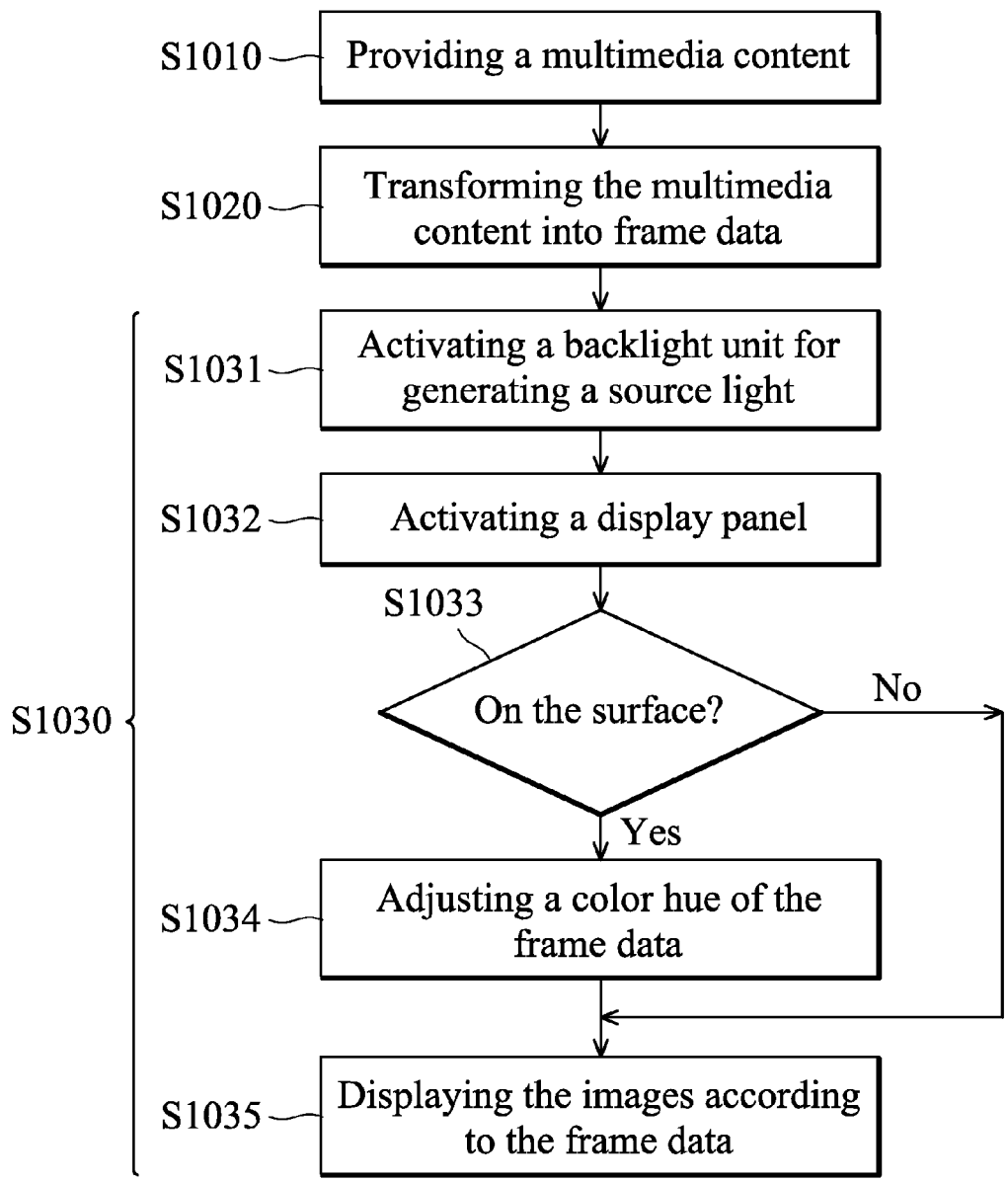

FIG. 10A is a schematic diagram of an exemplary embodiment of a control method, in accordance with some embodiments. First, a multimedia content is provided (step S1010). In one embodiment, the multimedia content is provided by a memory or a processor, which receives wireless signals. The multimedia content is transformed into frame data (step S1020). In one embodiment, an image processor is utilized to transform the multimedia content. Images are displayed (step S1030). In one embodiment, each of the images includes blue pixels, green pixels, and red pixels. In this embodiment, step S1030 comprises steps S1031-S1035. Step S1031 activates a backlight unit for generating a source light. The source light includes a deep blue-light of a low blue waveband and a far blue-light of a high blue waveband. Step S1032 activates a display panel for transforming the source light into the images based on the frame data and emits the images through a surface. In one embodiment, a covering mechanism is movably placed on the surface of the display panel It is determined whether a cover has been placed on the surface (step S1033). In this embodiment, the cover comprises a deep blue-light filter for restricting a light transmission rate in the low blue waveband. In one embodiment, the deep blue-light filter restricts 70% of the light transmission rate in the low blue waveband. The low blue waveband comprises a specific wavelength, and the specific wavelength is 435 nm.

When the cover has been placed on the surface, a color hue of the frame data to be transformed by the display panel is adjusted such that a weight of the blue pixels of the image is compensated (step S1034). Then, the display panel displays the images according to the frame data (step S1035). In one embodiment, step S1034 is to increase voltage levels corresponding to gray levels provided to the blue pixels to keep optical performance without color balance impact. In another embodiment, step S1034 is to reduce gray levels provided to the red and green pixels to maintain good color balance.

If the cover has not been placed on the surface, the display panel displays images according to the frame data (step S1035). In this embodiment, the frame data is generated by step S1020. In other words, the color hue of the frame data to be transformed by the display panel is not adjusted.

Figure 10B:
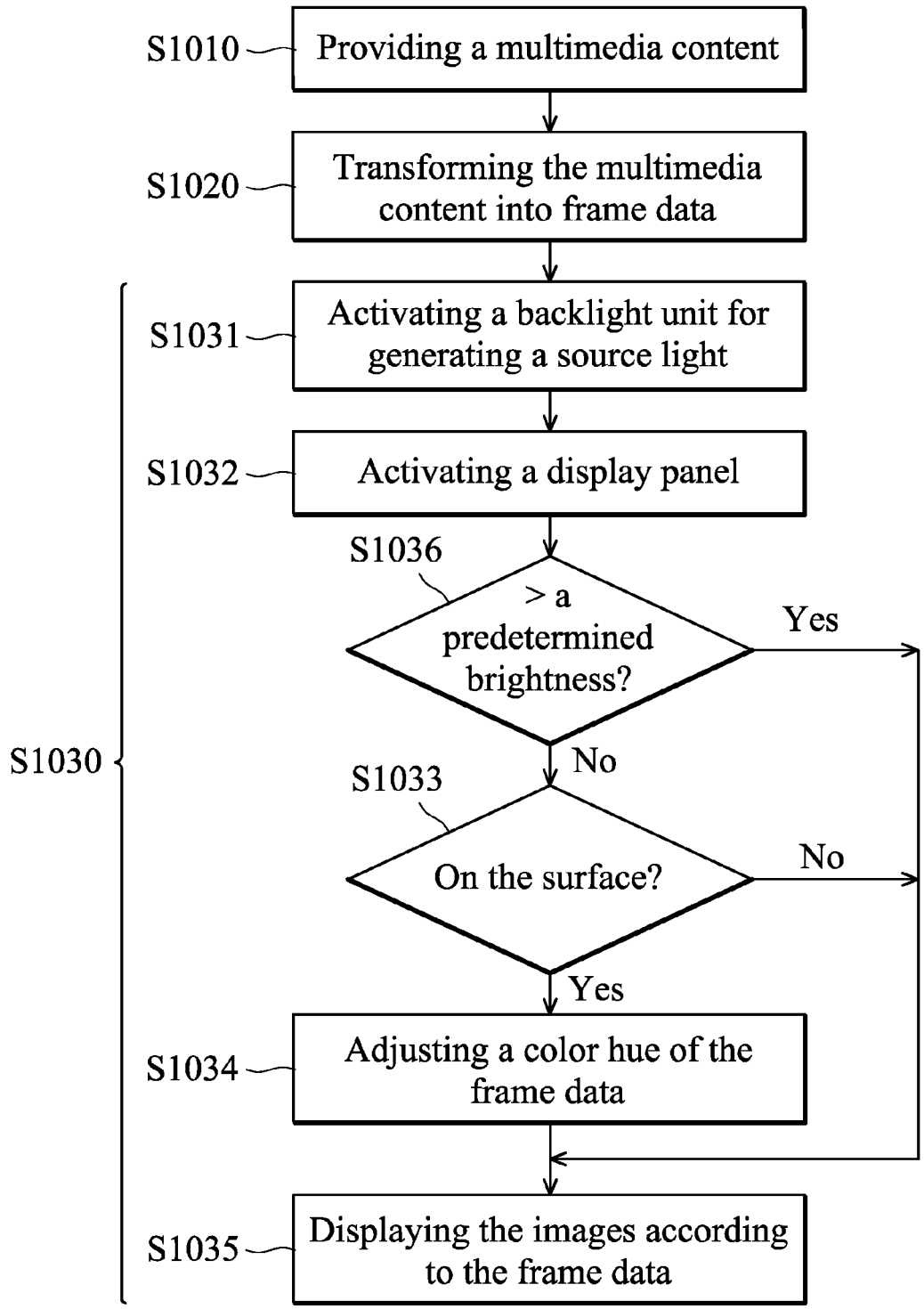

FIG. 10B is a schematic diagram of another exemplary embodiment of a control method, in accordance with some embodiments. FIG. 10B is similar to FIG. 10A except for the addition of step S1036. Step S1036 determines whether the brightness of an external light illumining the surface exceeds predetermined brightness. When the brightness of the external light exceeds the predetermined brightness, the color hue of the frame data is not adjusted and step S1035 is performed. When the brightness of the external light does not exceed the predetermined brightness, step S1033 is performed.

Figure 3B:
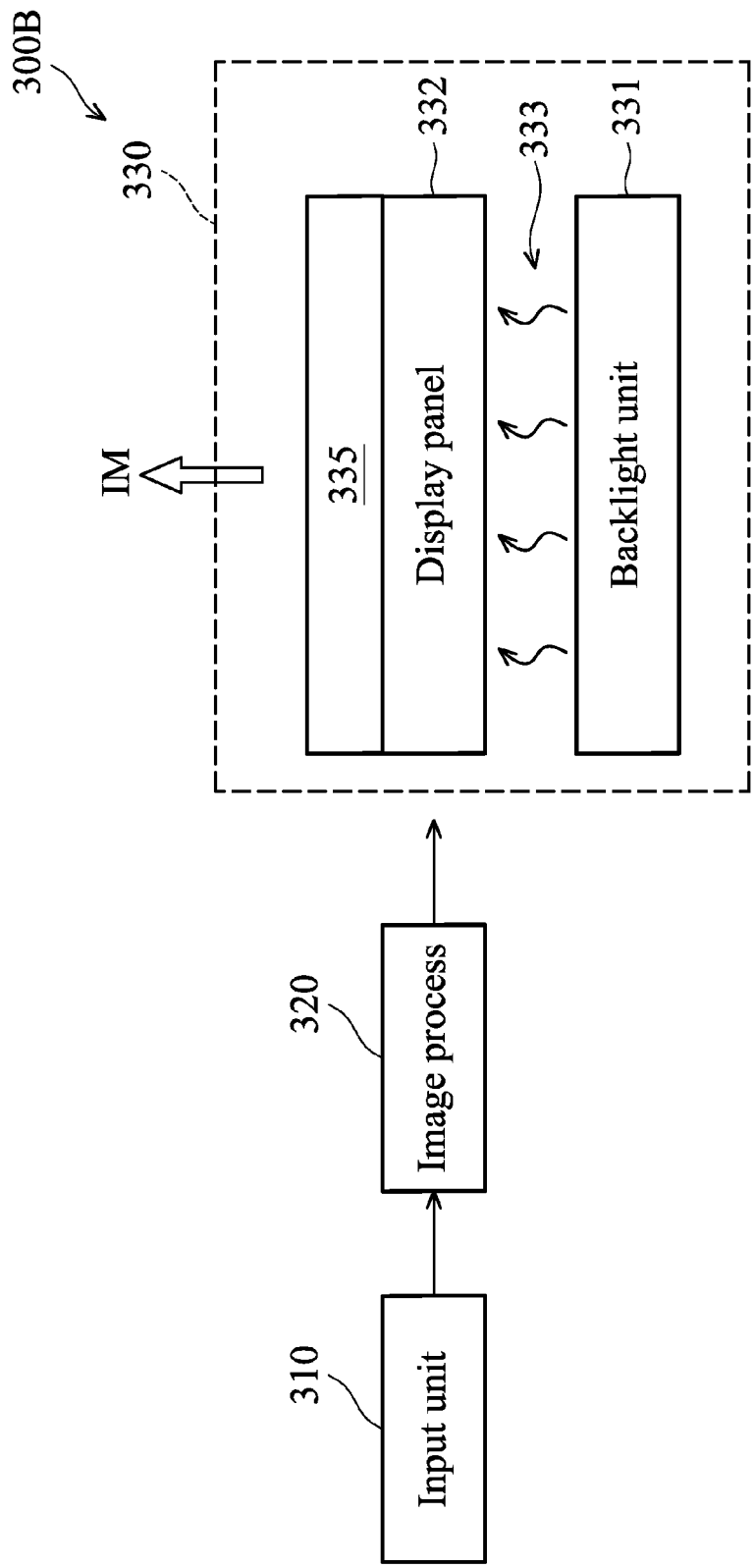

FIG. 11 shows a table showing the scratch and the color correction in FIGS. 3A, 3B and 8. In FIG. 3A, the deep blue-light filter is disposed under a touch window cover glass. Therefore, there is no scratch concern in the electronic device shown in FIG. 3A. Furthermore, there is no color correction in FIG. 3A.

Figure 12:
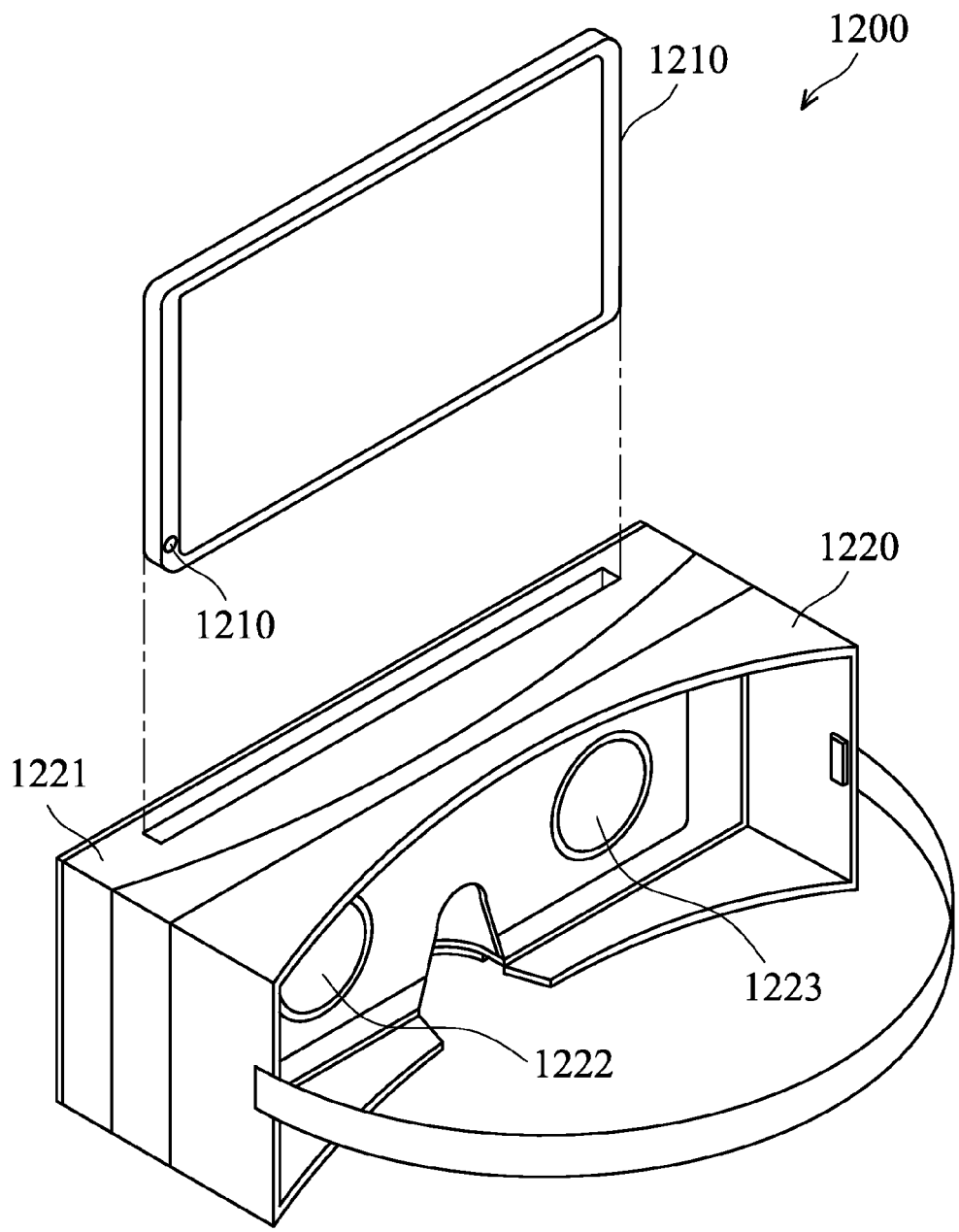

FIG. 12 is a schematic diagram of an exemplary embodiment of a display system, in accordance with some embodiments. The display system 1200 comprises a display device 1210 and a case 1221 of a head mounted display device 1220. The display device 1210 comprises a sensing unit 1210 for sensing whether the display device 1210 has been placed into the case 1221. In this embodiment, the display device 1210 further comprises an input device, an image processor and a display unit, which are similar to the input device 310, the image processor 320 and the display unit 330 shown in FIG. 3A such that the descriptions of the input device, the image processor and the display unit in the display device 1210 are omitted for brevity. In one embodiment, the image processor of the display device 1210 further inquires identification data including identification of the case 1221 if the sensing unit 1210 senses that the display device 1210 has been placed into the case 1221. The image processor of the display device 1210 adjusts a color hue of the frame data to be transformed by the display panel such that a weight of the blue pixels of the image is compensated if the identification data match a predetermined criterion. In one embodiment, the predetermined criterion means that a deep blue-light filter is disposed in the case 1221. In another embodiment, the deep blue-light filter is disposed in an optical path through which the source light passes for restricting a light transmission rate in the low blue waveband. In some embodiments, the deep blue-light filter is disposed in the display device 1210. The deep blue-light filter restricts 70% of the light transmission rate in the low blue waveband. The low blue waveband comprises a specific wavelength, and the specific wavelength is 435 nm.

As shown in FIG. 12, the case 1221 comprises at least one aperture to show the images. In this embodiment, the apertures 1222 and 1223 show images for the right-eye and the left-eye. In addition, the image processor in the display device 1210 increases voltage levels corresponding to gray levels provided to the blue pixels to adjust the color hue of the frame data. In another embodiment, the image processor reduces gray levels provided to the red and green pixels to adjust the color hue of the frame data.

Figure 13:
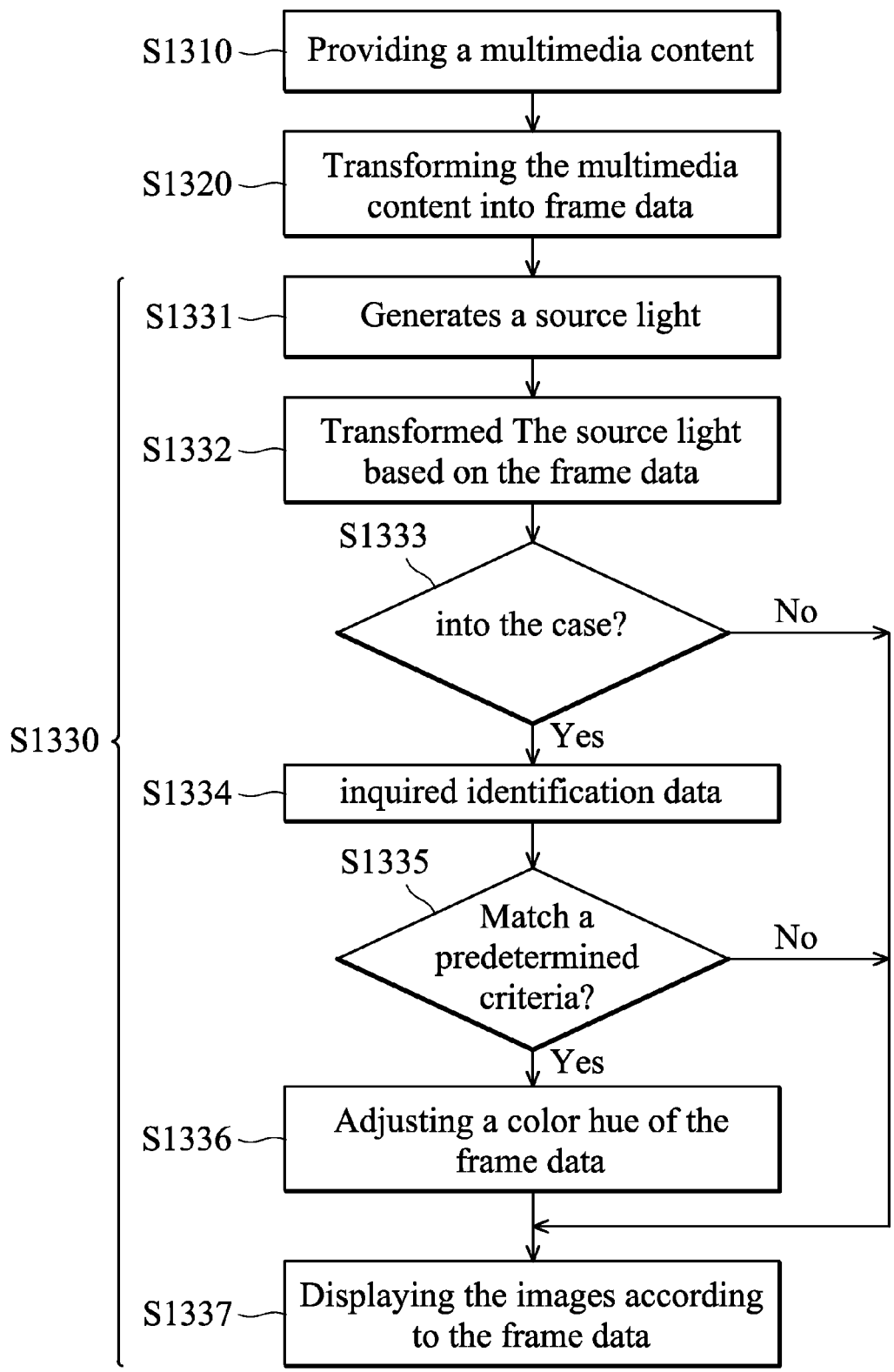

FIG. 13 is a schematic diagram of an exemplary embodiment of a control method for a display device capable of being placed into a case of a head mounted display device, in accordance with some embodiments. First, a multimedia content is provided (step S1310). The multimedia content is transformed into frame data (step S1320). Images including blue pixels, green pixels, and red pixels are displayed (step S1330). In this embodiment, step S1330 comprises steps S1331-S1337. Step S1331 generates a source light. The source light includes a deep blue-light of a low blue waveband and a far blue-light of a high blue waveband. The source light is transformed into the images based on the frame data (step 1332).

It is determined whether the display device has been placed into the case (step S1333). When the display device has been placed into the case, identification data including identification of the case is inquired (step S1334). When the display device has not been placed into the case, the display unit is activated according to the frame data generated by step S1320 to display the images (step S1337). In one embodiment, the case of the mounted display device has at least one aperture to show the images. Therefore, a user is capable of viewing the image via the aperture.

After the identification data is inquired, it is determined whether the identification data match a predetermined criterion (step S1335). When the identification data match the predetermined criterion, a color hue of the frame data is adjusted such that a weight of the blue pixels of the image is compensated (step S1336). Therefore, the display unit is activated according to the adjusted frame data generated by step S1336 to display the images (step S1337). When the identification data does not match the predetermined criterion, the display unit is activated according to the frame data generated by step S1320 to display the images (step S1337).

The invention does not limit how the color hue of the frame data is adjusted. In one embodiment, step S1336 is to increase voltage levels corresponding to gray levels provided to the blue pixels. In another embodiment, step S1336 is to reduce gray levels provided to the red and green pixels.

In this embodiment, a deep blue-light filter is arranged in an optical path through which the source light passes for restricting a light transmission rate in the low blue waveband. For example, the deep blue-light filter may be disposed in the display device or attached on the surface of a display panel of the display device. In some embodiments, the deep blue-light filter is disposed in the case, and the predetermined criterion means that the deep blue-light filter is disposed in the case. The deep blue-light filter may restrict 70% of the light transmission rate in the low blue waveband. The low blue waveband comprises a specific wavelength, which is 435 nm.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electronic device, comprising:
   an input unit, for providing a multimedia content;
   an image processor, for transforming the multimedia content into frame data; and
   a display unit for displaying images including blue pixels, green pixels, and red pixels, comprising:
   a backlight unit for generating a source light, wherein the source light includes a deep blue-light of a low blue waveband and a far blue-light of a high blue waveband;
   a display panel, for transforming the source light into the images based on the frame data and emitting the images through a surface, wherein an optical path travels through the backlight unit and the surface;
   a deep blue-light filter, arranged in the optical path through which the source light passes, for restricting a light transmission rate in the low blue waveband; and
   wherein the image processor adjusts a color hue of the frame data to be transformed by the display panel such that a weight of the blue pixels of the image is compensated, and wherein the image processor reduces gray levels provided to the red and green pixels.

2. The electronic device as claimed in claim 1, wherein the low blue waveband comprises a specific wavelength, and the specific wavelength is 435 nm.

3. The electronic device as claimed in claim 1, wherein the deep blue-light filter restricts 70% of the light transmission rate in the low blue waveband.

4. The electronic device as claimed in claim 1, wherein the backlight unit comprises:
   a light emitting diode configured to generate a white-light;
   a light guide guiding the white-light; and
   a brightness enhance film centralize the light traveling through the light guide.

5. The electronic device as claimed in claim 4, wherein the deep blue-light filter is disposed on the brightness enhance film .

6. The electronic device as claimed in claim 4, wherein the optical path travels through the light emitting diode, the light guide, and the brightness enhance film.

7. The electronic device as claimed in claim 1, wherein the display panel comprises a cover glass and a liquid-crystal cell, and the deep blue-light filter is disposed between the cover glass and the liquid-crystal cell.

8. The electronic device as claimed in claim 7, wherein the display panel further comprises a touch film disposed between the cover glass and the liquid-crystal cell, and the deep blue-light filter is integrated into the touch film.

9. The electronic device as claimed in claim 8, wherein the optical path travels through the liquid-crystal cell, the touch film, and the cover glass.

10. The electronic device as claimed in claim 7, wherein the display panel further comprises a touch film disposed between the cover glass and the liquid-crystal cell, and the deep blue-light filter is disposed between the cover glass and the touch film.

11. The electronic device as claimed in claim 7, wherein the display panel further comprises a touch film disposed between the cover glass and the liquid-crystal cell, and the deep blue-light filter is disposed between the touch film and the liquid-crystal cell.

12. The electronic device as claimed in claim 11, wherein the deep blue-light filter is a color filter to filter red-light, green-light and blue-light component of the source light.

13. The electronic device as claimed in claim 1, wherein the deep blue-light filter is a multilayer coating.

14. The electronic device as claimed in claim 1, wherein the deep blue-light filter is constituted by absorbing materials.

15. The electronic device as claimed in claim 1, wherein the image processor increases voltage levels corresponding to gray levels provided to the blue pixels to adjust the color hue of the frame data.

16. The electronic device as claimed in claim 1, wherein the image processor reduces gray levels provided to the red and green pixels to adjust the color hue of the frame data.

17. A control method controlling an electronic device and comprising:
providing a multimedia content;
transforming the multimedia content into frame data; and
displaying images including blue pixels, green pixels, and red pixels, wherein the step of display the images comprises:
activating a backlight unit for generating a source light, wherein the source light includes a deep blue-light of a low blue waveband and a far blue-light of a high blue waveband;
activating a display panel, for transforming the source light into the images based on the frame data and emitting the images through a surface, wherein an optical path travels through the backlight unit and the surface;
arranging a deep blue-light filter in the optical path through which the source light passes, for restricting a light transmission rate in the low blue waveband; and
adjusting a color hue of the frame data to be transformed by the display panel such that a weight of the blue pixels of the image is compensated, wherein gray levels provided to the red and green pixels are reduced.

18. The control method as claimed in claim 17, wherein the low blue waveband comprises a specific wavelength, and the specific wavelength is 435 nm.

19. The control method as claimed in claim 17, wherein 70% of the light transmission rate in the low blue waveband is restricted.

20. The control method as claimed in claim 17, wherein the step of adjusting the color hue of the frame data is to increase voltage levels corresponding to gray levels provided to the blue pixels.

21. The control method as claimed in claim 17, wherein the step of adjusting the color hue of the frame data is to reduce gray levels provided to the red and green pixels.

22. A display system, comprising:
an electronic device, comprising:
an input unit, for providing a multimedia content;
an image processor, for transforming the multimedia content into frame data;
a display unit for displaying images including blue pixels, green pixels, and red pixels, comprising:
a backlight unit for generating a source light, wherein the source light includes a deep blue-light of a low blue waveband and a far blue-light of a high blue waveband;
a display panel, for transforming the source light into the images based on the frame data and emitting the images through a surface;
a cover, comprising:
a deep blue-light filter, for restricting a light transmission rate in the low blue waveband; and
a covering mechanism for movably placing the cover on the surface of the display unit,
wherein the image processor is configured to:
determine that the cover has been placed on the surface; and
adjust a color hue of the frame data to be transformed by the display panel such that a weight of the blue pixels of the image is compensated in response to determining that the cover has been placed on the surface.

23. The display system as claimed in claim 22, wherein when the brightness of an external light illumining the surface exceeds a predetermined brightness, the image processor stops adjusting the color hue of the frame data to be transformed by the display panel.

24. The display system as claimed in claim 22, wherein the low blue waveband comprises a specific wavelength, and the specific wavelength is 435 nm.

25. The display system as claimed in claim 22, wherein the deep blue-light filter restricts 70% of the light transmission rate in the low blue waveband.

26. The display system as claimed in claim 22, wherein the image processor increases voltage levels corresponding to gray levels provided to the blue pixels to adjust the color hue of the frame data.

27. The display system as claimed in claim 22, wherein the image processor reduces gray levels provided to the red and green pixels to adjust the color hue of the frame data.

28. A control method, comprising:
providing a multimedia content;
transforming the multimedia content into frame data; and
displaying images including blue pixels, green pixels, and red pixels, wherein the step of displaying images comprises
activating a backlight unit for generating a source light, wherein the source light includes a deep blue-light of a low blue waveband and a far blue-light of a high blue waveband;
activating a display panel for transforming the source light into the images based on the frame data and emitting the images through a surface, wherein a covering mechanism is movably placed on the surface of the display panel;
determining that a cover has been placed on the surface, wherein the cover comprises a deep blue-light filter for restricting a light transmission rate in the low blue waveband; and
adjusting a color hue of the frame data to be transformed by the display panel such that a weight of the blue pixels of the image is compensated in response to determining that the cover has been placed on the surface.

29. The control method as claimed in claim 28, wherein when the brightness of an external light illumining the surface exceeds a predetermined brightness, the step of adjusting the color hue of the frame data is stopped.

30. The control method as claimed in claim 28, wherein the low blue waveband comprises a specific wavelength, and the specific wavelength is 435 nm.

31. The control method as claimed in claim 28, wherein the deep blue-light filter restricts 70% of the light transmission rate in the low blue waveband.

32. The control method as claimed in claim 28, wherein the step of adjusting the color hue of the frame data is to increase voltage levels corresponding to gray levels provided to the blue pixels.

33. The control method as claimed in claim 28, wherein the step of adjusting the color hue of the frame data is to reduce gray levels provided to the red and green pixels.

34. A display device capable of being placed into a case of a head mounted display device, comprising:
   a sensing unit for sensing whether the display device has been placed into the case;
   an input device, for providing a multimedia content;
   an image processor, for transforming the multimedia content into frame data;
   a display unit for displaying images including blue pixels, green pixels, and red pixels, and comprising:
      a backlight unit for generating a source light, wherein the source light includes a deep blue-light of a low blue waveband and a far blue-light of a high blue waveband;
      a display panel, for transforming the source light into the images based on the frame data;
   wherein the image processor is configured to:
      inquire identification data including identification of the case if the sensing unit senses that the display device has been placed into the case; and
      adjust a color hue of the frame data to be transformed by the display panel such that a weight of the blue pixels of the image is compensated if the identification data match a predetermined criterion.

35. The display device as claimed in claim 34, wherein the case comprises at least one aperture to show the images.

36. The display device as claimed in claim 34, further comprising a deep blue-light filter arranged in the optical path through which the source light passes for restricting a light transmission rate in the low blue waveband.

37. The display device as claimed in claim 36, wherein the predetermined criterion means that the deep blue-light filter is disposed in the case.

38. The display device as claimed in claim 36, wherein the deep blue-light filter restricts 70% of the light transmission rate in the low blue waveband.

39. The display device as claimed in claim 34, wherein the low blue waveband comprises a specific wavelength, and the specific wavelength is 435 nm.

40. The display device as claimed in claim 34, wherein the image processor increases voltage levels corresponding to gray levels provided to the blue pixels to adjust the color hue of the frame data.

41. The display device as claimed in claim 34, wherein the image processor reduces gray levels provided to the red and green pixels to adjust the color hue of the frame data.

42. A control method for a display device capable of being placed into a case of a head mounted display device, comprising:
   providing a multimedia content;
   transforming the multimedia content into frame data;
   displaying images including blue pixels, green pixels, and red pixels, wherein the step of display the images comprises:
      generating a source light, wherein the source light includes a deep blue-light of a low blue waveband and a far blue-light of a high blue waveband;
      transforming the source light into the images based on the frame data;
   inquiring identification data including identification of the case when the display device has been placed into the case; and
   adjusting a color hue of the frame data such that a weight of the blue pixels of the image is compensated if the identification data match a predetermined criterion, wherein gray levels provided to the red and green pixels are reduced; and
   arranging a deep blue-light filter in the optical path through which the source light passes for restricting a light transmission rate in the low blue waveband.

43. The control method as claimed in claim 42, wherein the predetermined criterion means that the deep blue-light filter is disposed in the case.

44. The control method as claimed in claim 42, wherein 70% of the light transmission rate in the low blue waveband is restricted by the deep blue-light filter.

45. The control method as claimed in claim 42, wherein the low blue waveband comprises a specific wavelength, and the specific wavelength is 435 nm.

46. The control method as claimed in claim 42, wherein the step of adjusting the color hue of the frame data is to increase voltage levels corresponding to gray levels provided to the blue pixels.

47. The control method as claimed in claim 42, wherein the step of adjusting the color hue of the frame data is to reduce gray levels provided to the red and green pixels.

* * * * *